Oct. 4, 1960 C. NICKELL 2,954,695
TEMPERATURE CONTROL AND INDICATOR MECHANISM
Filed June 15, 1955 4 Sheets-Sheet 4

INVENTOR
Creigh Nickell

BY Mason, Fenwick & Lawrence
ATTORNEYS

United States Patent Office 2,954,695
Patented Oct. 4, 1960

2,954,695
TEMPERATURE CONTROL AND INDICATOR MECHANISM

Creigh Nickell, Ronceverte, W. Va., assignor to Appalachian Electronic Instruments, Inc., Ronceverte, W. Va., a corporation of West Virginia Filed June 15, 1955, Ser. No. 515,654

3 Claims. (Cl. 73—362)

The present invention relates in general to electrical systems and apparatus for controlling the input to slave apparatus to establish a condition thereof at a desired magnitude and more particularly to electronic indication and control systems for controlling the action of slave heating and refrigeration apparatus in accordance with deviation of a detected controlled condition from the desired magnitude and for continuously indicating the temperature in the controlled condition from an independent detection source.

An object of the present invention is the provision of a novel indication and control system for controlling the action of slave apparatus in accordance with departure of a selected condition from a desired condition for continuously indicating the magnitude of the condition in an improved manner affording high accuracy of instantaneous control and indication over a wide range of desired conditions.

Another object of the present invention is the provision of novel apparatus for controlling the action of slave temperature establishing apparatus to establish and maintain a desired temperature condition and continuously indicate the actual temperature condition present throughout operation of the slave apparatus without disturbing the accuracy or response of the slave apparatus.

Another object of the present invention is the provision of noval apparatus for controlling the action of slave heating and refrigeration apparatus to seek establishment of a desired temperature condition in accordance with an electrical unbalance signal produced in response to a detected departure of the actual temperature condition from the desired condition for automatically indicating throughout operation of the control apparatus the temperature condition present in response to an independently produced electrical unbalanced signal whereby errors in the control system are not reflected into the temperature indication system.

Another object of the present invention is the provision of a novel coordination and arrangement of actual and desired temperature indicators and their associated components in apparatus for controlling slave heating and refrigeration apparatus to establish temperature conditions of desired magnitudes and continuously indicate from independently derived signals the actual temperature condition produced.

Other objects, advantages and capabilities of the present invention will become apparent from the following detail description, taken in conjunction with the accompanying drawings showing only a preferred embodiment of the invention.

Figure 1:
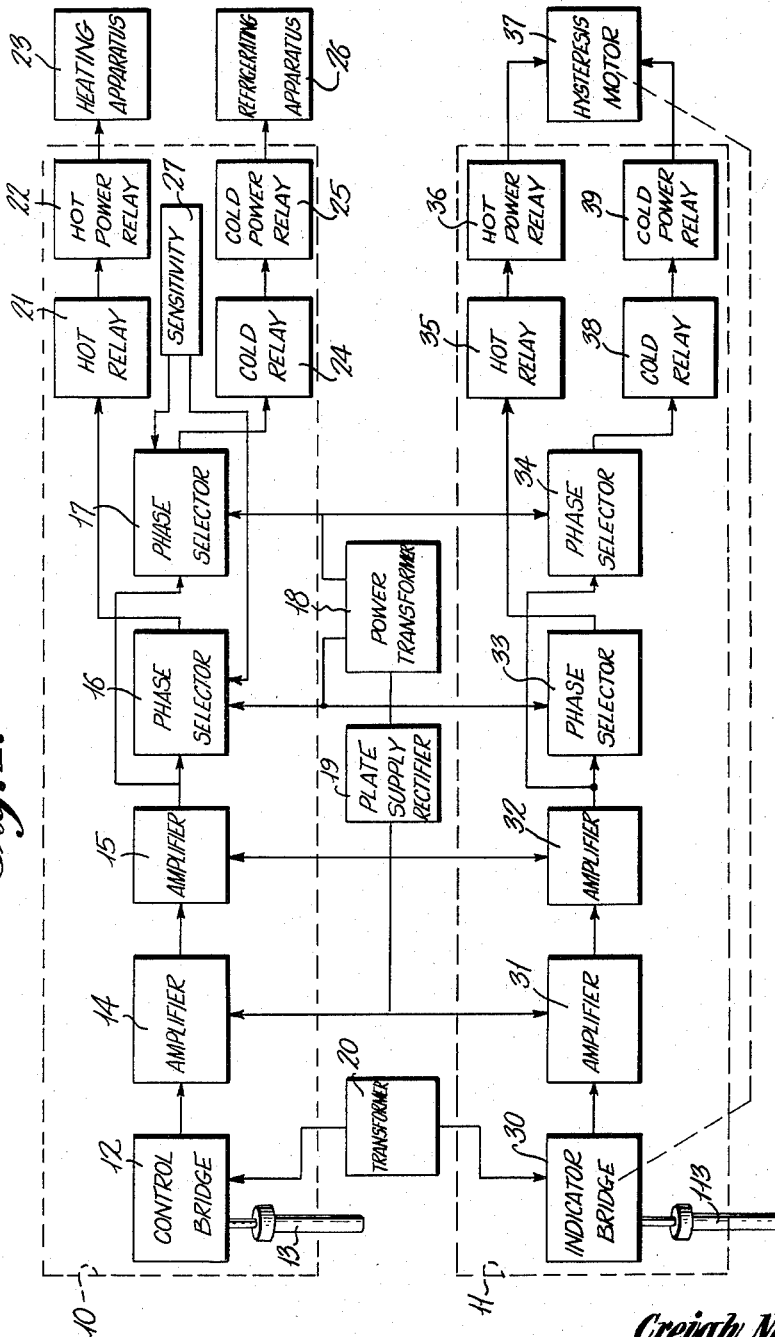
Figure 1 is a block diagram of the electrical components of a control and indication system embodying the invention.

Referring to the drawings, wherein like reference characters designate the corresponding parts throughout the several figures, and particularly to Figure 1 showing a block diagram of the electrical components, the present invention comprises a control network 10 for producing an unbalance voltage representative of departure of actual temperature conditions in a test area from a desired magnitude, and a measuring network 11 producing an unbalance voltage in accordance with the departure of the position of an indicator dial from a true indication of the magnitude of the condition present in the test area for driving a mechanism to position the indicator dial to give a correct indication of the condition. The control network 10 and indication network 11 are entirely separate except for the common power supplies to the two networks so as to avoid any inherent errors or misadjustments in one network from giving a false unbalance voltage condition in the other network.

The control network 10 comprises a control bridge 12 of the well known Wheatstone type having a manually controllable variable resistance in one leg of the bridge and a resistance temperature detector probe 13 in another leg of the bridge. The detector 13 is preferably formed of a material having a substantial temperature coefficient of resistance, and in the preferred embodiment, consists of a resistance temperature detector probe of the type disclosed in U.S. Patent No. 2,398,892, the resistance temperature probe 13 being preferably intercoupled with the remaining control bridge components by means of a flexible conductor so as to permit use of the resistance temperature probe at a position exterior to the control network 10. For brevity in the succeeding discussion, it will be assumed that the system is responsive to changes in temperature in the test area. Upon deviation of the temperature detected by the resistance temperature probe 13 from the desired magnitude corresponding with the setting of the manually controllable variable resistance in the control bridge 12, an unbalance voltage is produced at the output of the control bridge 12, which is applied to the control grid of one of the two stages of a duo-triode amplifier stage 14, the amplified output in the anode circuit of the input stage of the duo-triode amplifier 14 being coupled to the control grid of the second stage for additional amplification of the unbalance voltage signal. The amplified signal in the anode circuit of the second stage of the duo-triode amplifier 14 is then coupled to the control grid of a triode amplifier 15 for successive amplification, and the anode circuit current in the amplifier stage 15 is coupled to the inputs of two duo-triode phase selector stages 16 and 17. In the actual preferred embodiment, a corresponding section of two duo-triodes are connected together to form a "Hot" phase selector and the remaining sections of the two duo-triodes are interconnected to form a "Cold" phase selector. For purposes of simplifying this discussion, however, the interconnected sections forming the "Hot" and "Cold" phase selectors will be lumped in the block diagram as a "Hot" phase selector 16 and a "Cold" phase selector 17.

The sections of the "Hot" phase selector 16 are supplied with 60-cycle alternating current plate voltage from a power transformer 18 and the sections of the "Cold" phase selector 17 are supplied with 60-cycle alternating current plate voltage, also from the power transformer 18, which is 180° out of phase with the alternating current plate voltage supply to the "Hot" phase selector 16. The amplifiers 14 and 15 are provided with direct current plate voltage from a rectifier stage 19 supplied with alternating current from one output terminal of the power transformer 18 and the control bridge 12 is supplied with a low voltage 60-cycle alternating current supply from a power transformer 20 so that the phase selectors 16 and 17 will be caused to conduct by unbalance voltages produced at the control bridge output in relation to the phase of the unbalance voltage.

A 2 ampere relay 21, which will be hereinafter designated a "Hot" relay, is connected in series in the anode circuit of the "Hot" phase selector sections 16 to be energized when the phase of the unbalance voltage produced at the output terminals of the control bridge 12 is in phase with the plate voltage supply to the "Hot" phase selector 16. The 2 ampere "Hot" relay 21, when energized, supplies 110 volt alternating current to a 10 ampere "Hot" power relay 22, which in turn controls the supply to external heating apparatus 23 for producing heat in the test area.

Likewise, a 2 ampere "Cold" relay 24 is provided in the anode circuit of the "Cold" phase selector sections 17 to be energized when the phase selector 17 conducts, which then establishes a 110 volt supply to a 10 ampere "Cold" power relay 25 which in turn controls energization of external refrigerating apparatus 26 in thermal contact with the test area.

Additionally, a sensitivity control or "anti-hunt" stage 27 is interconnected between terminals of the "Hot" and "Cold" relays 21 and 24 and the cathodes of the phase selector 16 and phase selector 17 to control the time required to throw the relays 21 and 24 out of action as the signal from the unbalanced bridge circuit 12 approaches zero to complete a heating or cooling cycle in progress from overshooting the temperature setting manually established in the control bridge 12.

The indicator network 11 is substantially identical in the majority of its stages to the control network 10 and comprises an indicator bridge 30 likewise supplied with alternating current from the transformer 20 and having an external resistance temperature detector probe 113 corresponding in construction to the probe 13. The unbalance voltage produced at the output terminals of the indicator bridge 30 is coupled successively through a two-stage duo-triode amplifier 31 and a triode amplifier 32, the anode circuit current in the amplifier stage 32 being coupled to a two-section "Hot" phase selector 33 and a two-section "Cold" phase selector 34 whose plate voltages are 180° out of phase alternating current plate voltages derived from the power transformer 18. The anode current produced when the "Hot" phase selector 33 conducts upon occurrence of an unbalance voltage from the indicator bridge 30 in-phase therewith is coupled through a 2 ampere "Hot" relay 35 which, upon energization, establishes a 110 volt supply to a 10 ampere "Hot" power relay 36 whose contacts establish and terminate 110 volt A.C. supply to one field coil, for example, the clockwise field coil of a hysteresis motor 37. Likewise, conduction established in the anode circuit of the "Cold" phase selector 34 energizes a 2 ampere "Cold" relay 38 which in turn energizes a 10 ampere "Cold" relay 39 to establish a 110 volt A.C. supply to another field coil, for example, the counterclockwise field coil of the hysteresis motor 37. The shaft of the hysteresis motor 37 is mechanically connected to a variable resistor in the indicator bridge 30 to continue variation of the resistance setting of the variable resistor as long as the hysteresis motor is rotated by its field coil currents. In this manner, the error signals supplied to the field coils of the hysteresis motor continue until the variable resistor in the indicator bridge circuit 30 brings the indicator bridge 30 into balance, producing a zero unbalance voltage. As an indicator dial is also physically mounted on the hysteresis motor output shaft, and is initially adjusted and calibrated, it will be positioned by the hysteresis motor to give a correct indication of the condition detected by the resistance temperature probe 113.

Figure 2:
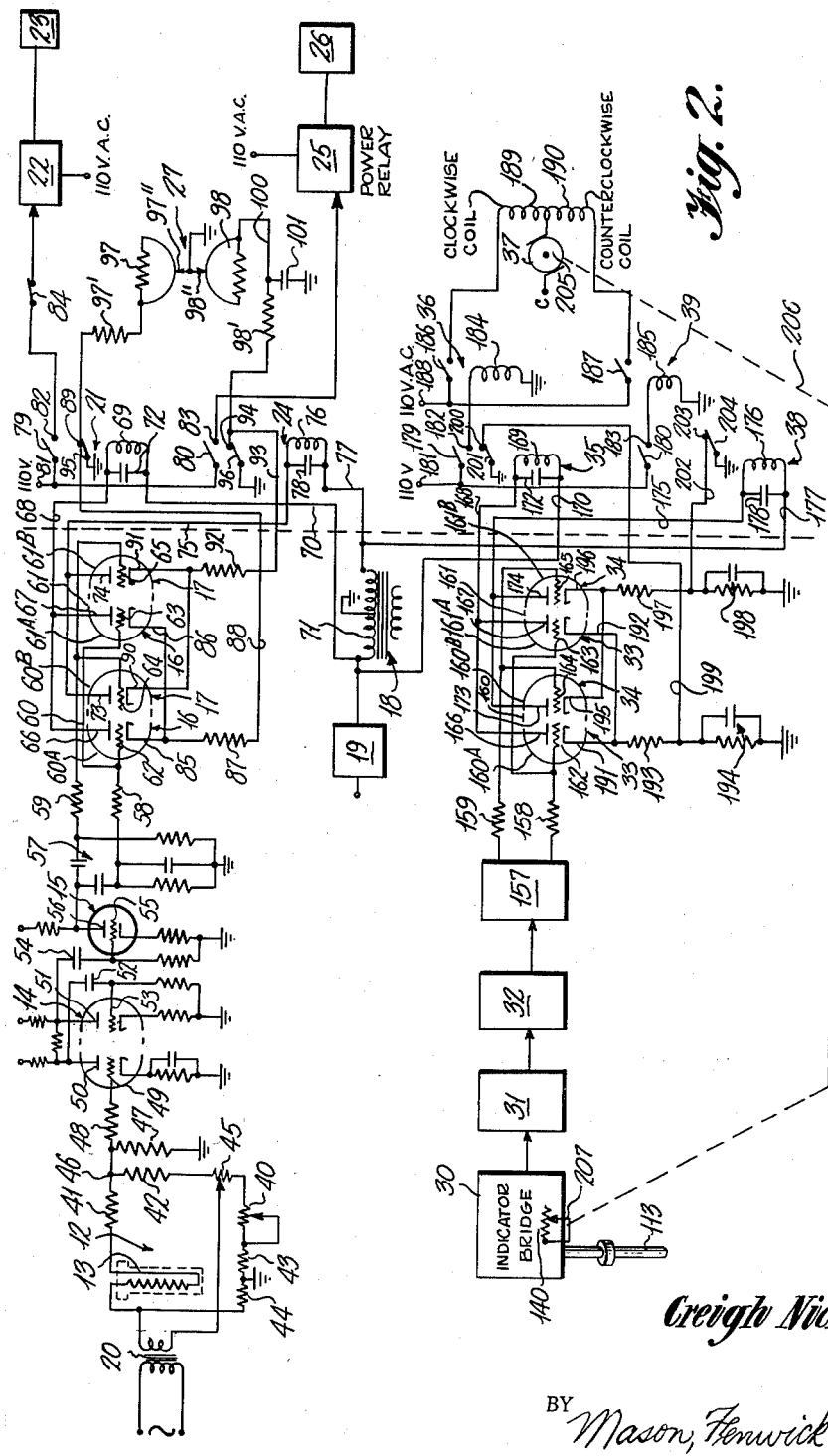
Figure 2 is an electrical schematic diagram illustrating the control and indication system embodying the present invention.

A schematic diagram of one form of preferred circuitry for this control and indication system is illustrated in Figure 2. The control bridge 12 of this preferred embodiment comprises a resistance temperature test probe 13 which is preferably of the type disclosed in the U.S. Patent No. 2,398,892, which has a temperature coefficient of resistance so that the electrical resistance of the probe varies in near linear relation with variations in surrounding temperature. Included in addition to the probe 13 is a manually adjustable variable potentiometer 40 which, in the preferred embodiment, is physically coupled with a dial graduated in terms of temperature to be manually set to the temperature desired to be established in the test area. Fixed resistors 41, 42, 43 and 44 complete the legs of the Wheatstone bridge 12 and the input voltage of the bridge is supplied from a suitable source of alternating current exemplified by the secondary of a transformer 20, one lead of the secondary of which is coupled to the movable arm of a calibrating potentiometer 45. The unbalance voltage produced between the output terminal 46 and the grounded point of the control bridge 12 is imposed across a grid bias resistor 47 and coupled through a resistor 48 to the control grid 49 of one stage of the duo-triode amplifier 14. The anodes 50 and 51 of the duo-triode amplifier 14 are connected through plate resistors to a source of direct current plate supply voltage derived in the conventional manner from the filtered output of a rectifier supply stage 19, and the anode 50 is connected through a condenser 52 to the control grid 53 of the second triode stage of the duo-triode amplifier 14. The amplified signal in the circuit of the anode 51 is coupled through a condenser 54 to the control grid 55 of the triode amplifier 15, whose anode 56 is supplied with rectified direct current voltage from the output of the rectifier 19. The amplified signal in the anode circuit of the amplifier triode 15 is thence supplied through a resistance and capacitance network 57 and resistors 58 and 59 to the grids of phase selector tubes 60 and 61. The signal coupled through the resistor 58 is applied to the interconnected grids 62 and 63 of the triode sections 60A and 61A of the duo-triodes 60 and 61, and the signal coupled through the resistor 59 is applied to the intercoupled grids 64 and 65 of the triode sections 60B and 61B of the duo-triodes 60 and 61. The sections 60A and 61A comprise the "Hot" phase selector 16 described in connection with the block diagram of Figure 1 and the sections 60B and 61B comprise the "Cold" phase selector 17 described in connection with Figure 1. The anodes 66 and 67 of the triode sections 60A and 61A are directly connected with each other and are connected through a lead 68 to one end of a relay coil 69 of the 2 ampere "Hot" relay 21, the other end of the relay coil 69 being connected through a lead 70 to one of the two oppositely phased taps of the secondary 71 of the power transformer 18. The power transformer 18 in the preferred embodiment is an A.C. primary transformer having the primary connected across a 110 volt 60-cycle supply and having a high voltage 260/260 A.C. 2 tap secondary and a low voltage 6.3 volt A.C. secondary for supplying filament current. A condenser 72 is connected across the relay coil 69.

Likewise, the anodes 73 and 74 of the triode sections 60B and 61B are directly connected together and are connected through a lead 75 to one side of a relay coil 76 of the 2 ampere "Cold" relay 24, the other end of the relay coil 76 being connected through a lead 77 to the other high voltage secondary tap of the power transformer 18. A condenser 78 is also provided across the relay coil 76.

The "Hot" and "Cold" 2 ampere relays 21 and 24 are each of the dual contact type, the uppermost contact arms 79 and 80 of the relays 21 and 24, respectively, being connected to a terminal 81 to which a 110 volt supply is applied, and the fixed contacts 82 and 83 associated respectively with the arms 79 and 80 are connected to the 10 ampere "Hot" and "Cold" power relays 22 and 25, respectively, to energize the coils of those relays. There is, however, inserted in the lead between the fixed contact 82 and the coil of the 10 ampere "Hot" relay 22 a microswitch 84 whose arm is actuated by some facility in the system, such as the dial of the indicator bridge potentiometer, to open the circuit between the fixed relay terminal 82 and the relay 22 when the temperature in the test area reaches a preselected magnitude which, in the preferred embodiment, is 290° F.

The cathodes 85 and 86 of the phase selector triode sections 60A and 61A are directly connected together and are connected from their junction through a resistor 87 and lead 88 to the fixed contact 89 of the relay 21, and the cathodes 90 and 91 of the phase selector sections 60B and 61B are directly connected together and are connected through a resistor 92 and lead 93 with the fixed contact 94 of the 2 ampere "Cold" relay 24. The contact arms 95 and 96 of the relays 21 and 24, respectively, are normally in contact with their associated fixed contacts 89 and 94 and are directly connected to ground.

The fixed contacts 89 and 94 of the relays 21 and 24, respectively, are also connected to a sensitivity selector or "anti-hunt" circuit, indicated generally by the reference character 27, and contact 89 being connected through a series resistor 97' to a variable resistor 97 and the fixed contact 94 being connected through a series resistor 98' to the variable resistor 98. The two variable resistors 97 and 98 are provided with movable contact arms 97" and 98" which are directly connected to ground and constitute the sensitivity selector. The lead 100 extending between the fixed resistor 98' and variable resistor 98 is also connected to ground through a condenser 101. The contact arms 97" and 98" of the sensitivity selector 27 are set to impose a bias voltage on the cathodes of the phase selectors 60 and 61 when the heating or refrigerating cycles are in progress and one of the relays 21 and 24 have energized open circuiting the grounded contact arms 95 and 96 relative to their fixed contacts 89 and 94 to set the time required to throw the energized relay out of action as the signal from the unbalanced bridge circuit 12 approaches zero.

In the operation of this control circuit, assuming the thermally variable resistance probe 13 to be inserted in the test area and subjected to the existing temperature therein and the arm of the variable potentiometer 40 of the Wheatstone bridge 12 adjusted to the temperature desired to be established in the test area, an unbalance voltage will be produced at the terminal 46 of the Wheatstone bridge 12 relative to the grounded point of the bridge, which unbalanced voltage will be successively amplified by the two sections of the amplifier 14 and the triode amplifier 15. This amplified unbalance voltage is then applied through the resistance and capacitance network 57 and through the grid resistors 58 and 59 to the grids 62 and 63 of the phase selector sections 60A and 61A and to the grids 64 and 65 of the phase selector sections 60B and 61B. This amplified unbalance voltage will cause the phase selector sections 60A, 61A or the sections 60B, 61B to conduct during alternate half cycles of the alternating current plate voltage applied to the anodes of these phase selector sections in those phase selector sections whose anode voltages are in phase with the unbalance grid voltage.

Assuming the unbalance voltage derived from the control bridge 12 is in phase with the alternating current plate supply to the anodes 66 and 67 of the sections 60A and 61A, these sections will be caused to conduct during the positive half cycles of the alternating current plate voltage applied thereto, which conduction energizes the 2 ampere hot relay coil 69 of the relay 21. Energizing of the relay coil 69 open circuits the grounded relay contact arm 95 relative to its fixed contact 89 to connect the cathodes 85 and 86 of the sections 60A, 61A to the sensitivity selectors 27, and shifts the contact arm 79 into contact with the fixed contact 82 to apply the 110 volt supply derived from the terminal 81 through the closed microswitch 84 to the coil of the 10 ampere power relay 22 which, upon energization, supplies a 110 volt activating current to the heating apparatus 23. This supply to the heating apparatus 23 is, of course, continued until the unbalance voltage of this polarity derived from the control bridge 12 reaches the point approaching zero at which the bias from the sensitivity selector cuts off the conduction in the phase selector sections 60A, 61A.

If the unbalance voltage at the output terminal 46 of the control bridge 12, as determined by the resistance of the probe 13 and variable resistor 40, is of opposite phase, the phase selector sections 60B, 61B will be caused to conduct in the same manner as the sections 60A, 61A were caused to conduct in the previous example, thereby energizing the relay coil 76 to open circuit the grounded contact arm 96 and shift the contact arm 80 into contact with the fixed contact 83 to apply 110 volt supply to the coil of the 10 ampere power relay 25 and in turn establish the 110 volt supply to the refrigerating apparatus 26.

The resistor 97' connected in series with relay terminal 89 and resistor 98' and condenser 101 connected with relay terminal 94 form "drop-out" circuits allowing the control network to establish a preset condition without overshooting. In each case, when the relay coils 69 or 76 are energized, these "drop-out" circuits forming biasing resistors are connected in series with the cathodes of the phase selectors, which cause the relays to immediately drop out. This creates an oscillating effect allowing the control network to function with proportional control as the network approaches a given temperature condition.

In the indication network 11, the indicator bridge 30, amplifier stages 31 and 32, and resistance-capacitance network 157 are identical in circuitry with the control bridge 12 amplifier sections 13 and 14 and resistance-capacitance network 57 so that the schematic of these circuits is not repeated in Figure 2, the stages being indicated in block diagram only. The resistance temperature probe 113 of the indicator bridge 30 is identical in construction and operation to the probe 13 of the control bridge 12 and the variable resistor of the indicator bridge 30 corresponding to the variable resistor 40 of the control bridge 12 has been indicated by the reference character 140.

The two output leads from the resistance-capacitance network 157 are connected through series resistors 158, 159 corresponding to the resistors 58 and 59 of the control network 10 to apply the unbalance voltage from the indicator bridge 30 through the resistor 158 to the triode sections 160A and 161A of the duo-triode phase selector tube 160 and 161 forming the phase selector stages 33 and 34. The control grids 162 and 163 of the phase selector sections 160A, 161A are connected together and connected directly to the resistor 158 and the control grids 164 and 165 of the phase selector sections 160B and 161B are connected together and connected directly to the resistor 159. The anodes 166 and 167 of the sections 160A and 160B are connected together through a lead 168 to one end of a relay coil 169 forming the coil of the 2 ampere "Hot" relay 35, the other end of the relay coils 169 being connected through the lead 170 to the same secondary tap of the power transformer 18 to which the lead 70 is connected. A condenser 172 is coupled across the relay coil 169.

Likewise, the anodes 173 and 174 of the phase selector sections 160B and 161B are connected together through a lead 175 to a relay coil 176, the lower end of which is connected through a lead 177 to the tap of the power transformer 18 to which the lead 77 is connected. A condenser 178 is coupled across a relay coil 176.

The relays 35 and 36 having the coils 169 and 176, respectively, are dual contact relays, each having a contact arm 179 and 180, respectively, which are connected to a terminal 181 to which 110 volts alternating current is supplied and associated fixed contacts 182 and 183, respectively, which are connected to relay coils 184 and 185 of 10 ampere relays 36 and 39, whose contacts 186 and 187, respectively, are connected to a terminal 188 to which 110 volt alternating current is supplied and to the clockwise coil 189 and the counterclockwise coil 190, respectively, of a hysteresis motor 37.

The cathodes 191 and 192 of the phase selector sections 160A, 161A are connected together through a resistor 193 and a resistance-capacitance network 194 to ground. Likewise, the cathodes 195 and 196 of the phase selector sections 160B, 161B are connected together through a resistor 197 and a resistance-capacitance 198 to ground. A lead 199 extends from the junction between the resistance 193 and the resistance-capacitance network 194 to the fixed contact 200 of the relay 35 and the associated contact arm 201 is connected directly to ground. The junction between the resistance 197 and the resistance-capacitance network 198 is likewise connected by a lead 202 to the fixed contact 203 of the relay 38 and the associated contact arm 204 is connected directly to ground. The resistance-capacitance biasing networks 194 and 198 and their association with the cathodes of the phase selectors 160 and 161 and with the relays 35 and 38 serve a similar function to the sensitivity control 27 of the control network 10 in that they apply a higher biasing voltage to the cathodes of the phase selectors 160, 161 when their associated relays 35, 38 are energized and the contacts 200, 201 and 203, 204 are open circuited to set the time required to throw these relays out of action as the signal from the unbalance bridge circuit approaches zero.

The shaft of the armature 205 of the hysteresis motor 37 is mechanically connected, as indicated by the dotted line 206, to the movable arm 207 of the variable potentiometer 140 in the indicator bridge 30. Accordingly, if the position of the arm 207 of the bridge potentiometer 140, to which a graduated dial to be later described is fixed, does not accurately correspond to the actual temperature in the test area in which the resistance temperature probe 113 is inserted, the legs of the indicator bridge 30 will be out of balance and an unbalance voltage will be produced at the output terminals of the bridge 30 which will be amplified by the amplifiers 31 and 32 and coupled through the network 157 to the grids of the phase selectors 160, 161. If this unbalance voltage is in phase with the alternating current plate voltage applied to the anodes 166, 167 of the phase selector sections 160A, 161A, these sections will be caused to conduct, thereby producing a current flow through the relay coil 169 to energize this relay and close the associated relay contacts 179 and 182. This supplies 110 volts alternating current to the relay coil 184 of the relay 36. When the relay 36 is energized, its contact 186 is closed, supplying 110 volts from the terminal 188 to the clockwise coil 189 of the hysteresis motor 37 to rotate armature 205 in a clockwise direction and, through the linkage 206, vary the resistance setting of the movable arm 207 of the potentiometer 140. An unbalance voltage at the output of the indicator bridge 30 of opposite phase will cause the sections 160B, 161B of the phase selectors to conduct, energizing the relays 38 and 39 to supply 110 volts to the counterclockwise coil 190 of the hysteresis motor which adjusts the arm 207 of the bridge potentiometer 140 in the opposite direction. In this manner, the hysteresis motor and the potentiometer 140 are driven by unbalance voltages at the output of the indicator bridge 30 to re-establish balance in the indicator bridge and, through the rotation of the hysteresis motor armature 205, shift the indicator dial in a corresponding manner.

Figure 3:
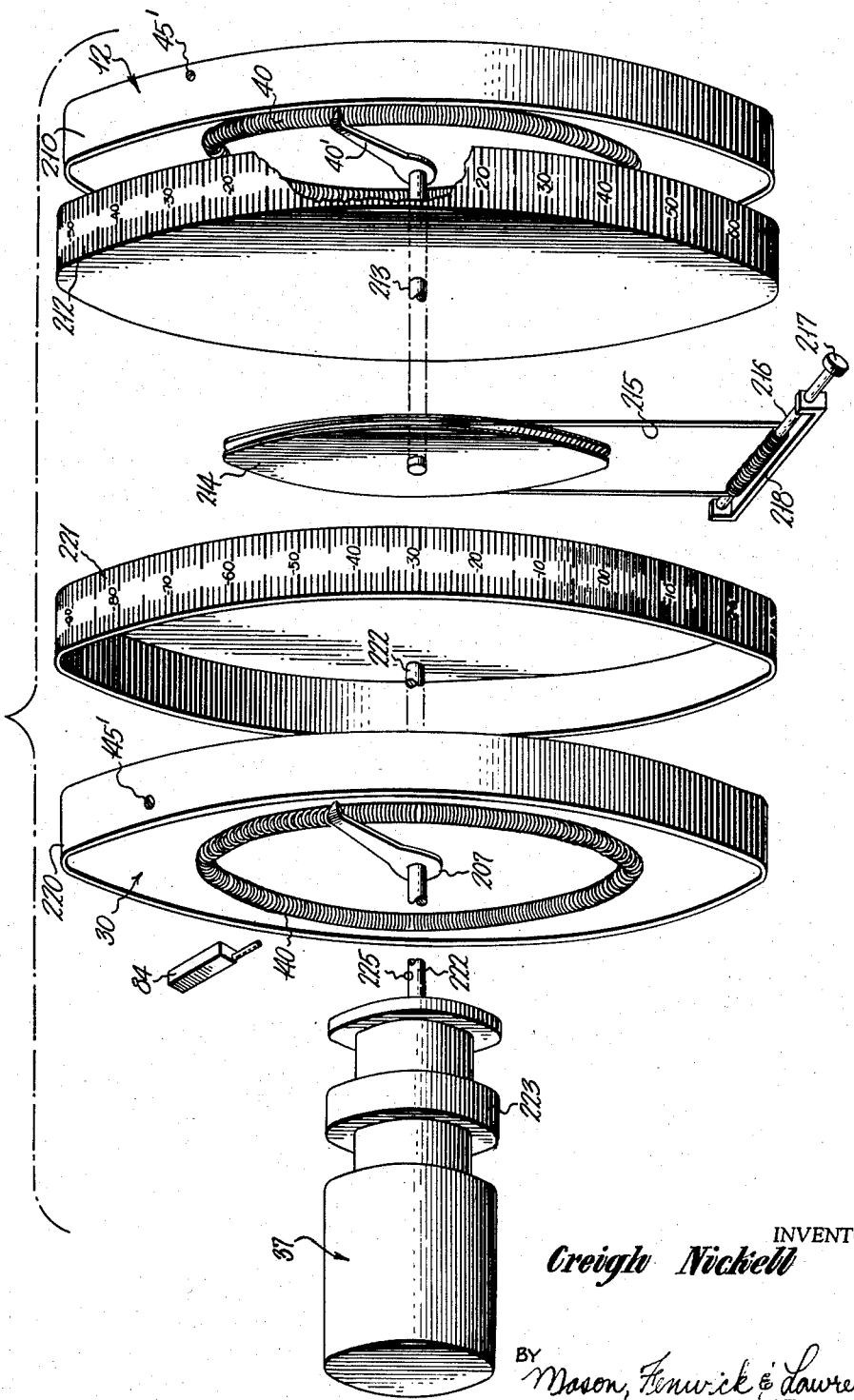
Figure 3 is a schematic illustration of the physical arrangement of the electrical and mechanical manual control and indication components of the system embodying the present invention, with parts shown in exploded relation.
Figure 4:
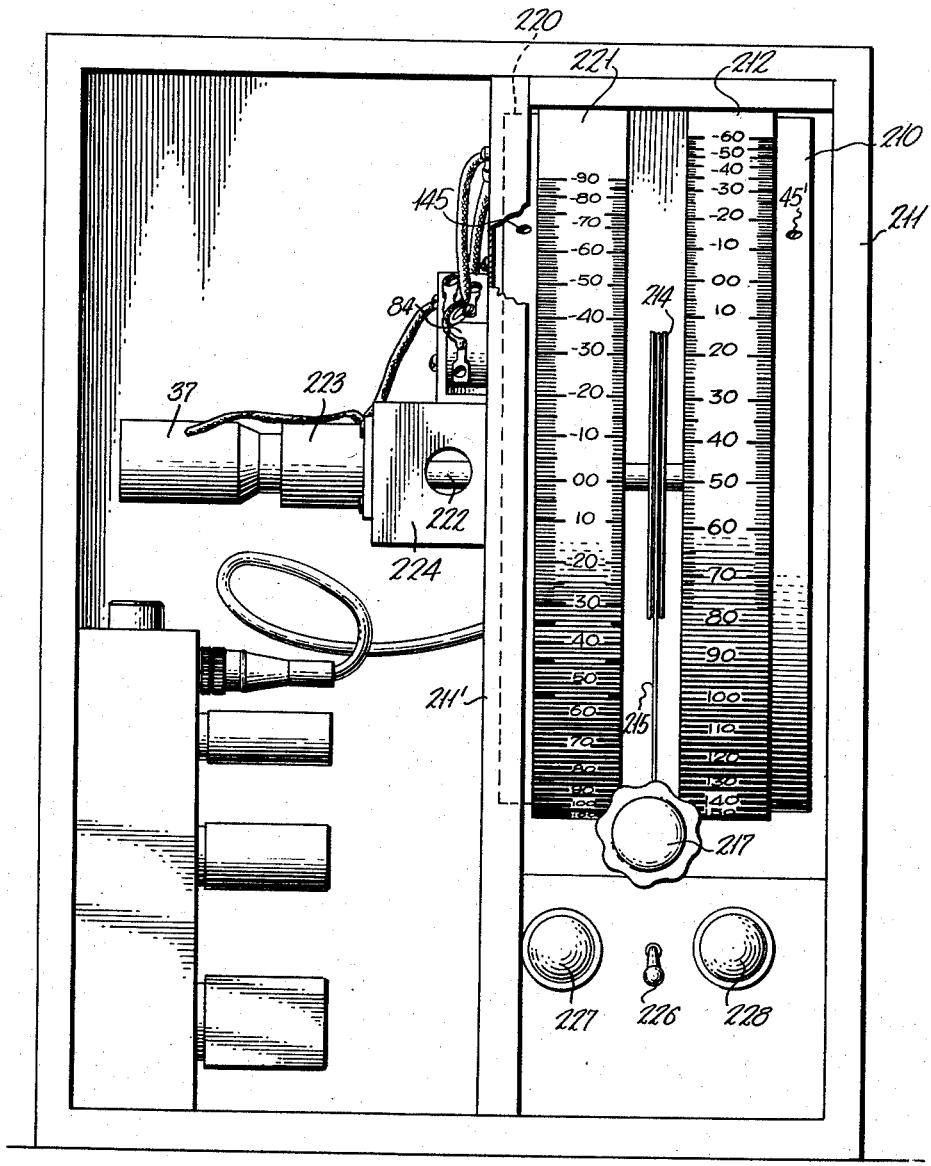
Figure 4 is a front elevation of a control and indication cabinet embodying the present invention.

Figures 3 and 4 illustrate the manner in which the control and indicator bridges 12 and 30, the hysteresis motor 37, and the visual indicating facilities for the control bridge 12 and indicator bridge 30 are arranged in the unit. The control bridge 12, including the variable potentiometer 40 having a rotatable contact arm 40' thereon is arranged in a cylindrical bridge housing 210 coaxially related to the axis of the potentiometer 40 and arm 40'. The control bridge housing 210 is fixed to one wall of the cabinet 211 for the unit. A cylindrical control dial or drum 212 is fixed to a shaft 213 which extends through the same and is fixed to the arm 40' of the potentiometer 40. The control dial or drum 212 is in the form of a peripherally flanged disk of a diameter so that the flange thereof bearing dial markings on the outer surface is adapted to fit over and rotate about the cylindrical wall of the control bridge housing 210. Fixed on the end of the shaft 213 opposite the end to which the potentiometer arm 40' is fixed is a control drum pulley 214 about which is trained a string 215 wound about a shaft 216 having a knob 217 on the end thereof and journalled in a fixed bracket 218 fixed to the cabinet 211. A fixed index mark is provided at a desired location on the front panel (not shown) of the cabinet 211 of the unit in proximity to the graduations on the control drum 212. Rotation of the knob 217, therefore, effects corresponding rotation of the graduated surface of the control drum 212 and the potentiometer arm 40' to adjust the control bridge 12 out of balance and produce an unbalance signal which effects actuation of the heating apparatus 23 or refrigerating apparatus 26 in a manner previously described to bring the temperature in a test area into correspondence with that indicated on the control drum opposite the fixed index mark.

An indicator bridge housing 220 is also fixed on an intermediate wall 211' of the cabinet 211 and houses the components of the indicator bridge 30, including the potentiometer 140 and its rotatable arm 207. A screw 145' projects through the wall of the indicator bridge housing 220 to an exposed position to effect adjustment of the calibrating resistor of the indicator bridge circuit corresponding to the resistor 45 of the control bridge. Coaxially related with the indicator bridge housing 220, in the same manner as that described in connection with the control drum 212 and bridge housing 210, is an indicator dial or drum 221 having a cylindrical flanged periphery bearing temperature graduation markings which, when aligned with a fixed index mark on the front panel of the cabinet 211, is designed to indicate the temperature detected by the indicator network 11. The control drum 212 and indicator drum 221, as illustrated in Figure 4, are axially aligned with each other and disposed side-by-side so that an operator can immediately determine the existing temperature at any instant in the test area in relation to the temperature desired to be established, as indicated by the control drum markings.

A compact association of the indicator bridge housing 220 and indicator drum 221 with the components actuating the same is provided by extending a shaft 222 through the indicator bridge housing to which the indicator bridge potentiometer arm 207 and the indicator drum 221 are fixed. The output shaft of a gear reducer 223 is directly fixed to the end of the shaft 222 opposite to that to which the indicator drum 221 is connected in axial alignment therewith. The gear reducer 223 is supported on a bracket 224 fixed to the intermediate wall 211' of the cabinet 211. Rigidly supported in axial alignment with the gear reducer 223 by direct mounting on the gear reducer housing is the hysteresis motor 37 whose armature shaft drives the gear reducer 223 to shift the indicator bridge potentiometer arm 207 and indicator drum 221 in accordance with the phase selection made in the indicator network 11 from unbalance voltages produced in the indicator bridge 30.

The microswitch 84 is also physically supported on the intermediate cabinet wall 211' with the arm thereof positioned to be engaged by a projection 225 on the shaft 222 corresponding to the radial position of the graduations on the indicator drum 221 designated 290° F. so as to open the microswitch 84 when the indicator drum reaches this position.

Disposed below the control drum knob 217 between the intermediate wall 211' and the adjacent side wall of the cabinet 211 is a master switch 226 controlling the power supply to the primary of the main power transformer 18 and the auxiliary power supplies in the system, flanked by colored signal lights 227 and 228 disposed in the supply circuits to the heating apparatus 23 and refrigerating apparatus 26 to be illuminated and visually indicate when heat and cold are being applied to the test area.

While but one particular embodiment of the invention has been shown and described, it is apparent that other various modifications may be made in the invention without departing from the spirit and scope thereof, and it is desired, therefore, that only such limitations shall be placed thereon as are imposed by the prior art and are set forth in the appended claims.

I claim:

1. An indicating system providing for measurement and indication of the temperature in a test area comprising a bridge network including an impedance responsive to changes in the temperature and an adjustable impedance in balancing relation thereto for producing an unbalance voltage upon departure of said impedances from balancing relation, an electric motor having a pair of field coils which individually rotate the motor in opposite directions, a detector responsive to said unbalance voltage including a plurality of phase sensitive electronic tubes and relays in the output circuits of said tubes to be energized to supply energizing voltages to either of said field coils in accordance with the phase relation of said unbalance voltage to a phase reference, a stationary cylindrical bridge housing arranged in a vertical plane about a reference horizontal axis for encasing the components of said bridge network excluding said temperature responsive impedance, said adjustable impedance having an annular resistance wire winding fixed within said bridge housing in concentric relation thereto and a contact arm rotatable about said reference horizontal axis having a radially remote portion contacting said annular resistance wire winding, a rotatable indicator drum having a disk-like body concentric with said bridge housing disposed adjacent said bridge housing and a peripheral flange lapping the cylindrical periphery of said bridge housing, said peripheral flange having graduations on the outer surface thereof representing magnitudes of temperature adapted to coact with a fixed fiducial mark to indicate magnitudes of temperature, a shaft extending through said bridge housing in alignment with the axis thereof having an intermediate portion thereof fixed to said contact arm to drive the same and an end thereof fixed to said disk-like portion of said indicator drum, gear reducer means intercoupling said electric motor with the end of said shaft opposite said indicator drum for driving said contact arm along said annular resistance wire winding in a direction tending to extinguish said unbalance voltage as long as an activating voltage is supplied by said relays to either of said field coils and to drive said indicator drum to cause the graduations on said peripheral flange thereof to continuously approach a position relative to the fixed fiducial mark representing a correct indication of the magnitude of the temperature in said test area, and means supporting said electric motor and gear reducer in axial alignment with said shaft.

2. In an indicating system providing for measurement and indication of the temperature in a test area of the type including a bridge network including an impedance responsive to changes in the temperature and an adjustable impedance in balancing relation thereto for producing an unbalance voltage upon departure of said impedances from balancing condition, an electric motor having a pair of field coils which individually rotate the motor in opposite directions, a detector responsive to said unbalance voltage including a plurality of phase sensitive electronic tubes and relays in the output circuits of said tubes to be energized to supply energizing voltages to either of said field coils in accordance with the phase relation of said unbalance voltage to a phase reference; the improvement comprising a stationary cylindrical bridge housing arranged in a vertical plane about a reference horizontal axis for encasing the components of said bridge network excluding said temperature responsive impedance, said adjustable impedance having an annular resistance wire winding fixed within said bridge housing in concentric relation thereto and a contact arm rotatable about said reference horizontal axis having a radially remote portion contacting said annular resistance wire winding, a rotatable indicator drum having a disk-like body concentric with said bridge housing disposed adjacent said bridge housing and a peripheral flange lapping the cylindrical periphery of said bridge housing, said peripheral flange having graduations on the outer surface thereof representing magnitudes of temperature adapted to coact with a fixed fiducial mark to indicate magnitudes of temperature, a shaft extending through said bridge housing in alignment with the axis thereof having an intermediate portion thereof fixed to said contact arm to drive the same and an end thereof fixed to said disk-like portion of said indicator drum, gear reducer means intercoupling said electric motor with the the end of said shaft opposite said indicator drum for driving said contact arm along said annular resistance wire winding in a direction tending to extinguish said unbalance voltage as long as an activating voltage is supplied by said relays to either of said field coils and to drive said indicator drum to cause the graduations on said peripheral flange thereof to continuously approach a position relative to the fixed fiducial mark representing a correct indication of the magnitude of the temperature in said test area.

3. In an indicating and control system for measuring and visually indicating continuously during operation the temperature in a test area and for controlling an agent to establish a temperature in the test area in accordance with a manually set designation of a desired temperature, an indicating and control cabinet having a transverse horizontal reference axis extending therethrough, a pair of laterally spaced cylindrical housings coaxially disposed in side-by-side relation along said reference axis and encasing control and indicator bridge networks each including an adjustable resistor having an annular resistance wire winding located in a vertical plane in concentric relation to said reference axis and exposed at one side of the associated housing and a resistor contact arm rotatable about said reference axis and having a radially remote portion contacting the annular winding, an indicator drum for indicating the temperature in said test area and a control drum for indicating said desired temperature designation, each of said drums including a disk coaxial with said reference axis disposed alongside its associated cylindrical housing and an annular peripheral flange having graduations on the outer surface thereof representing magnitudes of temperature said drums being rotatably supported in side-by-side relation adjacent each other with the annular flanges extending opposite from each other and lapping adjacent portions of and rotatable about the cylindrical walls of said housings in concentric relation therewith, an indicator shaft and a control shaft, respectively, associated with said indicator drum and said control drum, means interconnecting the contact arms of said adjustable resistors and their adjacent drums with their associated shafts for coordinating rotation of the same, manually operable means for adjusting the angular position of said control shaft to adjust the resistor contact arm interconnected therewith along the associated annular resistor winding, said control system including means responsive to voltage conditions at the control bridge network established by manual adjustment of said control shaft and the associated adjustable resistor and control drum to a selected temperature indication to activate said temperature establishing agent to vary temperature in the test area toward the selected temperature, said indicator bridge network including a temperature responsive resistor interconnected in balanced relation to said adjustable resistor located externally of said housing in said test area to respond to the temperature thereof and producing an unbalanced voltage upon departure of said resistors from balancing condition, a cylindrical electrical motor and a cylindrical gear reducer connected with each other and supported in axial alignment in said control cabinet in coaxial relation to said reference axis laterally spaced from said indicator drum, means connecting the output of said gear reducer to said indicator shaft for driving said resistor contact arm and indicator drum intercoupled therewith from said electric motor, and means responsive to unbalanced voltage at said indicator network to activate said motor to shift the contact arm of the indicator network resistor to extinguish the unbalanced voltage and position the indicator drum to indicate the temperature in the test area.

References Cited in the file of this patent

UNITED STATES PATENTS

| | | |
|---|---|---|
| 1,759,996 | Parker | May 27, 1930 |
| 1,791,563 | Horn | Feb. 10, 1931 |
| 1,831,732 | Allen | Nov. 10, 1931 |
| 2,069,490 | Fenske | Feb. 2, 1937 |
| 2,513,024 | Holmqvist | June 27, 1950 |
| 2,623,206 | Hornfeck | Dec. 23, 1952 |
| 2,649,715 | Goble | Aug. 25, 1953 |
| 2,659,234 | Harrison | Nov. 17, 1953 |
| 2,704,799 | Kwasniewski | Mar. 22, 1955 |
| 2,730,304 | Markow et al. | Jan. 10, 1956 |